United States Patent
Shimbo et al.

(10) Patent No.: US 6,546,104 B1
(45) Date of Patent: Apr. 8, 2003

(54) MONTGOMERY REDUCTION APPARATUS

(75) Inventors: Atsushi Shimbo, Tokyo (JP); Shinichi Kawamura, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/262,742

(22) Filed: Mar. 5, 1999

(30) Foreign Application Priority Data

Jun. 25, 1998 (JP) .............................. 10-178787

(51) Int. Cl.[7] .............................. H04L 9/00; G06F 7/38
(52) U.S. Cl. .............................. 380/28; 708/491
(58) Field of Search .......................... 380/28, 30, 490, 380/491, 492, 650, 653, 654; 708/490, 491, 492, 650, 653, 654

(56) References Cited

U.S. PATENT DOCUMENTS

| | | |
|---|---|---|
| 5,159,632 A | 10/1992 | Crandall |
| 5,271,061 A | 12/1993 | Crandall |
| 5,463,690 A | 10/1995 | Crandall |
| 5,724,279 A * | 3/1998 | Benaloh et al. ............. 708/491 |
| 5,764,554 A * | 6/1998 | Monier ........................ 708/491 |
| 5,987,131 A * | 11/1999 | Clapp .......................... 380/283 |

\* cited by examiner

Primary Examiner—Matthew Smithers
(74) Attorney, Agent, or Firm—Finnegan, Henderson, Farabow, Garrett & Dunner, L.L.P.

(57) ABSTRACT

In a Montgomery reduction apparatus for receiving positive integers C and p and calculating $D = C \cdot R^{-1} \bmod p$ by using R defined as $R = 2^n$ using an integer n falling within the range $n \geq L$ with a bit length being represented by L when p is expressed in binary notation, this invention includes an ($\alpha$, $\beta$) extraction section for calculating an integer pair ($\alpha$, $\beta$) satisfying $C = \alpha R + \beta$ on the basis of C and R, a multiplication section for obtaining $\epsilon \beta$ by multiplying $\epsilon$ satisfying $R^{-1} = \epsilon \pmod p$ and $\beta$ calculated by the ($\alpha$, $\beta$) extraction section, an addition section for obtaining $\alpha + \epsilon \beta$ by adding $\alpha$ calculated by the ($\alpha$, $\beta$) extraction section and $\epsilon \beta$ calculated by the multiplication section, and a calculation section for obtaining a remainder $D \equiv \alpha + \beta \cdot \epsilon \pmod p$ which is congruent to $\alpha + \epsilon \beta$ obtained by the addition section with respect to p as a modulus and is not more than p.

11 Claims, 8 Drawing Sheets

MONTGOMERY REDUCTION APPARATUS

BACKGROUND OF THE INVENTION

The present invention relates to a Montgomery reduction apparatus and a storage medium which are suitable for repetition of arithmetic processing including multiple-length multiplication using an odd integer as a modulus, e.g., public key encryption used for encryption of data in data communication over a computer network and authentication of a communication partner.

In an information communication network or computer system, electronic data are exchanged and accumulated. When such a system increases in size and an unspecified large number of users use the system, tapping and tampering by malevolent users become problems. To solve these problems, the public key encryption technique is often used.

In many cases, public key encryption is implemented by arithmetic operation (remainder computation system) using a multiple-length odd integer as a modulus. The speed of this arithmetic operation influences the performance of this scheme. In the remainder computation system, multiplication and division, in particular, exert great influences on the processing time. For example, in RSA encryption, encryption and decryption are executed by power calculations in a remainder computation system using an odd composite number as a modulus. In elliptic curve encryption on a prime field $F_p$, addition of points on an elliptic curve is implemented by an appropriate combination of addition, subtraction, multiplication, and division using an odd prime number as a modulus, and encryption and decryption are executed by repetition of the point addition operation.

When a multiplication (calculation of A*B mod p) in a remainder computation system is to be implemented, a multiple-length multiplication (calculation of C=A*B) and a multiple-length remainder calculation (calculation of C mod p) with respect to the multiplication result are often configured. In this case, the performance of a multiple-length remainder calculation tends to be inferior to that of a multiple-length multiplication, and hence several studies have been made on the efficiency of remainder calculations.

As a calculation algorithm suitable for repetitive execution of multiplication in a remainder computation system, the Montgomery calculation is known.

According to a Montgomery calculation method, multiplication in a remainder computation system using an odd integer as a modulus is executed as follows. First of all, a multiple-length multiplication of a multiplier A and a multiplicand B is executed to obtain C. Assume that A and B are equal to or smaller in size than an integer p as a modulus. A computation called Montgomery reduction is then performed for C to reduce its size to that of the modulus or less. That is, C having a size about twice that of the modulus p is reduced to that of the modulus p. The Montgomery reduction corresponds to a general remainder calculation. The processing amount for this operation is almost equal to that for one multiplication of multiple-length values. That is, the remainder calculation processing is made efficient. This is because, of arithmetic operations on a computer, division is time-consuming operation as compared with addition, subtraction, and multiplication.

The Montgomery calculation method is an algorithm suitable for repetitive execution of multiplication in a remainder computation system for the reason given below. The Montgomery calculation method is a multiplication algorithm using an element in a Montgomery operation domain (this is also a remainder system with the same modulus), and the following processing is required to implement a multiplication in a general remainder system. First of all, a multiplier and a multiplicand are converted into values in the Montgomery operation domain. A Montgomery multiplication (multiplication and Montgomery reduction) is then performed. Lastly, the result must be inversely converted from the Montgomery operation domain to the original remainder system. The correspondence between the elements in the Montgomery operation domain and the original remainder system is stored before and after the Montgomery multiplication. Assume that multiplication is to be repeated in the remainder computation system as in power calculation. In this case, if the base of a power is converted into a value in the Montgomery operation domain at first, the Montgomery multiplication result need not be inversely converted into a value in the original remainder system every time the result is obtained. The result can be repeatedly used as an input for Montgomery multiplication. It therefore suffices if the value in the Montgomery operation domain is converted into a value in the original remainder system as the end of power calculation. The computation sizes for conversion and inverse conversion to and from the Montgomery computation respectively correspond to one remainder calculation and one multiplication. When such operation is performed only once at the beginning and start of the overall processing, no overhead occurs.

Elements in the Montgomery operation domain and the general remainder system have the following relationship. First of all, a power of 2 which is prime relative to the modulus p and larger than the modulus p is defined as R. In general, R is often set as a value that is a multiple of the word size of a computer and the minimum value exceeding the size of the modulus p. Consider, for example, software for a 32-bit CPU, and 1,024bits the modulus p. In this case, if $R=2^{1024}$ ($=(2^{32})^{32}$), and the modulus p is 160 bits, $R=2^{160}$ ($=(2^{32})^{5}$).

If elements in the general remainder system are represented by a and b with R described above, elements in the Montgomery operation domain which correspond to the elements a and b are represented by A=aR(mod p) and B=bR(mod p). In Montgomery reduction, $D=CR^{-1}$(mod p)=(ab)R(mod p) is calculated with respect to C=AB. The element D in the Montgomery operation domain corresponds to the values a and b in the general remainder system. Montgomery reduction is arithmetic operation equivalent to $D=CR^{-1}$(mod p), and hence can also be used for inverse conversion of the element D in the Montgomery operation domain to an element d in the general remainder system. That is, $d=DR^{-1}$(mod p)=ab(mod p).

This Montgomery reduction is main arithmetic processing in Montgomery operation, and the processing speed of this arithmetic operation greatly influences the speed of encryption and the like. This arithmetic operation corresponds to about one multiple-length multiplication and hence is efficient as compared with computation methods other than the Montgomery computation method. Demands, however, have arisen for an increase in processing speed in consideration of the recent spread of encryption techniques and the like.

At present, there is no technique implemented, which can greatly reduce the processing amount of Montgomery reduction beyond one multiple-length multiplication. In practice, therefore, even the use of a Montgomery computation system cannot sufficiently improve the computation efficiency.

BRIEF SUMMARY OF THE INVENTION

The present invention has been made in consideration of the above situation, and has as its object to provide a Montgomery reduction apparatus which can implement Montgomery reduction with a small calculation amount and greatly improve the efficiency of Montgomery reduction.

It is another object of the present invention to provide an elliptic curve encryption apparatus using the Montgomery reduction apparatus.

In order to achieve the above objects, according to the first aspect of the present invention, there is provided a Montgomery reduction apparatus for receiving positive integers C and p and calculating $D=C\cdot R^{-1}$ mod p by using R defined as $R=2^n$ using an integer a falling within a range $n \geq L$ with a bit length being represented by L when p is expressed in binary notation, comprising:

an $(\alpha, \beta)$ extraction section for calculating an integer pair $(\alpha, \beta)$ satisfying $C=\alpha R+\beta$ on the basis of C and R;

a multiplication section for obtaining $\epsilon\beta$ by multiplying $\epsilon$ satisfying $R^{-1}=\epsilon \pmod{p}$ and $\beta$ calculated by the $(\alpha, \beta)$ extraction section;

an addition section for obtaining $\alpha+\epsilon\beta$ by adding $\alpha$ calculated by the $(\alpha, \beta)$ extraction section and $\epsilon\beta$ calculated by the multiplication section; and a calculation section for obtaining a remainder $D=\alpha+\beta\cdot\epsilon \pmod{p}$ which is congruent to $\alpha+\epsilon\beta$ obtained by the addition section with respect to p as a modulus and is not more than p.

According to the present invention, if, for example, $\epsilon$ is a value equal to or less than one word of the computer, the calculation to be performed by the multiplication section is a multiplication of a 1-word integer and a multiple-length integer. In addition, since the execution result obtained by the addition section becomes larger by about one word, it suffices if the last calculation section performs remainder calculation processing to reduce the data by one word. Since the computation size in other portions is small, a reduction in the overall processing amount can be achieved.

According to the second aspect of the present invention, there is provided a Montgomery reduction apparatus for receiving positive integers C and p and calculating $D=C\cdot R^{-1}$ mod p by using R defined as $R=2^n$ using an integer n falling within a range $n \geq L$ with a bit length being represented by L when p is expressed in binary notation, comprising:

an $(\alpha, \beta)$ extraction section for calculating an integer pair $(\alpha, \beta)$ satisfying $C=\alpha R'+\beta$ on the basis of C and R when w represents a word length and R' represents a value obtained by dividing R by $2^w$;

a multiplication section for obtaining $\epsilon\beta$ by multiplying an integer $\epsilon$ satisfying $R'^{-1}=\epsilon \pmod{p}$ and $\beta$ calculated by the $(\alpha, \beta)$ extraction section;

an addition section for obtaining $\alpha+\epsilon\beta$ by adding $\alpha$ calculated by the $(\alpha, \beta)$ extraction section and $\epsilon\beta$ calculated by the multiplication section; and a calculation section for obtaining $(\alpha+\epsilon\beta)\cdot 2^{-w} \pmod{p}$ on the basis of $\alpha+\epsilon\beta$ obtained by the addition section and w.

According to the present invention, if, for example, $\epsilon$ is a value equal to or less than one word of the computer, the calculation to be performed by the multiplication section is a multiplication of a 1-word integer and a multiple-length integer. In addition, the execution result obtained by the addition section becomes larger by about one word. The last calculation section can be implemented by Montgomery reduction operation for reducing the data by the lowermost one word, i.e., the processing amount corresponding to a multiplication of a 1-word integer and a multiple-length integer. Since the computation size in other portions is small, a reduction in the overall processing amount can be achieved.

According to the third aspect of the present invention, there is provided a Montgomery reduction apparatus for receiving positive integers C and p and calculating $D=C\cdot R^{-1}$ mod p by using R defined as $R=2^n$ using an integer n falling within a range $n \geq L$ with a bit length being represented by L when p is expressed in binary notation, comprising:

an $(\alpha, \beta)$ extraction section for calculating an integer pair $(\alpha, \beta)$ satisfying $C=\alpha R+\beta$ on the basis of C and R;

a multiplication section for calculating $\epsilon\beta$ by multiplying $\epsilon$ satisfying $R'^{-1}=\epsilon \pmod{p}$ when w represents a word length and R' represents a value obtained by dividing R by $2^w$ and $\beta$ extracted by the $(\alpha, \beta)$ extraction section; and a calculation section for obtaining $E=\epsilon\beta 2^{-w} \pmod{p}$ on the basis of $\epsilon\beta$ obtained by the multiplication section and w, and obtaining $\alpha+E \pmod{p}$ on the basis of obtained E and a calculated by the $(\alpha, \beta)$ extraction section.

According to the present invention, if, for example, $\epsilon$ is a value equal to or less than one word of the computer, the calculation to be performed by the multiplication section is a multiplication of a 1-word integer and a multiple-length integer. The calculation section for E can be implemented by Montgomery reduction operation for reducing the data by the lowermost one word, i.e., the processing amount corresponding to a multiplication of a 1-word integer and a multiple-length integer. Since the computation size in other portions is small, a reduction in the overall processing amount can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A Montgomery reduction apparatus and method of the present invention aim at more efficiently implementing Montgomery reduction as an algorithm for efficient remainder calculation. More specifically, efficient arithmetic operation is implemented by setting a modulus p to a value suitable for an arithmetic expression in Montgomery reduction.

Montgomery reduction is an algorithm for executing remainder calculation in a remainder computation system using an odd integer as a modulus. Although the modulus p need not be an odd number, it is assumed in this embodiment for the sake of descriptive convenience that the modulus p is an odd prime number.

When Montgomery reduction is to be used, a constant R must be obtained from the bit size of the modulus p. The constant R needs to meet conditions that R>p and R and p are relatively prime. In Montgomery reduction, the remainder and quotient must be obtained by using R. To execute these processes efficiently, the size of R is generally set to a multiple of the word length of the calculation unit to be mounted. More specifically, when the word length of the calculation unit is represented by w, $R=(2^w)^L$ (L is the minimum integer that satisfies R>p) is often set. For the sake of simplicity, assume in the following description that a bit size n of p is a multiple of w, and $R=2^n$. Note that these conditions are assumed for the sake of descriptive convenience, but the present invention itself is not limited by them.

In Montgomery reduction, $D=CR^-$ mod p is calculated with respect to a product C of positive integers A and B that are smaller than the modulus p. In this case, $R^-$ represents a multiplicative inverse element of R which satisfies $R \cdot R^{-1}=1$ mod p.

Each embodiment of the present invention will be described below.

(First Embodiment of Present Invention)

Figure 1:
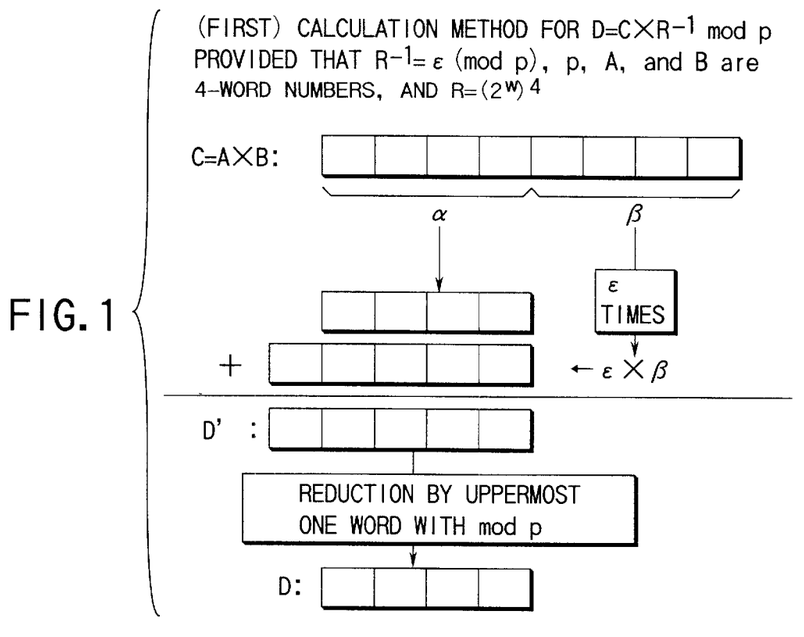
FIG. 1 is a view for explaining the principle of a Montgomery reduction calculation method in the first embodiment of the present invention.

FIG. 1 is a view for explaining the principle of a Montgomery reduction calculation method in the first embodiment of the present invention.

The present invention is based on the premise that a modulus p for which $\epsilon$ that satisfies $R^{-1}=\epsilon$(mod p) is present is used. In this case, $\epsilon$ is an integer that can be expressed by one word in a calculation unit.

Referring to FIG. 1, each block indicates one word. In addition, $\epsilon$ may be a negative integer. In this case, the same processing as that described below is performed with $\epsilon$ in the following description being replaced with $-\epsilon(\epsilon=-\epsilon'$ and $\epsilon'>0)$.

Since both A and B are integers smaller than the modulus A, a product C of these integers is smaller than a size twice that of the modulus p. Considering that R is set to $2^n$ where n is the size of the modulus p, when C is factorized into $C=\alpha R+\beta$ and is divided into values on the upper and lower position sides with reference to the position of the size of the modulus p (corresponding to the fourth word from the lowermost position), the numerical values on the upper and lower position sides are respectively represented by $\alpha$ and $\beta$. Then, we have $$D = C \times R^{-1}(\mod p)$$
$$= (\alpha R + \beta) \times R^{-1}(\mod p)$$
$$= \alpha + \beta R^{-1}(\mod p)$$
$$= \alpha + \epsilon\beta(\mod p)$$

The speciality ($R^{-1}=\epsilon$(mod p), i.e., $R^{-1}=\epsilon$ in this case) of the modulus p is used in rewriting the last equation.

As shown in FIG. 1, first of all, C is divided into $\alpha$ on the upper position side and $\beta$ on the lower position side, and $\beta$ is multiplied by $\epsilon$ determined by the modulus p. This product is added to $\alpha$. With the above operation, a congruent value D' can be calculated with respect to a value D obtained as Montgomery reduction and the modulus p.

As shown in FIG. 1, D' is a value larger in size than the modulus p by one word. The value D that is congruent with respect to the modulus p and smaller than p can be obtained from the value D' by a method of dividing D' by the modulus p and obtaining the remainder, a method of calculating a remainder table concerning values larger than p by one word in advance, and obtaining the value D by looking up the table, or the like.

The following is an example of the method using a remainder table. As a remainder table $T_j$, $T_j=2^j \times R$(mod p) (j=0, 1, 2, ..., w−1) is calculated in advance. D' is divided into an upper one word E and lower position side data F other than E. When each bit of E is looked up to detect that the ith bit (i=0, 1, 2, ..., w−1) from the least significant bit is 1, $T_i$ is added to F. In this manner, a value that is congruent to D' with respect to the modulus p and smaller than D' is obtained.

The result can be divided into data larger than R and data less than R and similar processing can be repeated. When such data is reduced by this processing to a value larger in bit size than the modulus p by about two or three bits, a remainder smaller than the modulus p can be calculated by repeatedly reducing p within the range in which the result remains positive. Since the modulus p to which the above arithmetic operation principle can be applied can be described by $\epsilon R-1=0$(mod p) by rewriting $R^{-1}=\epsilon$(mod p), when $\epsilon \cdot 2^n-1$ can be divided by an n-bit prime number, prime factors p and $\epsilon$ at this time can be used.

An apparatus for implementing the above computation method will be described in detail next.

Figure 2:
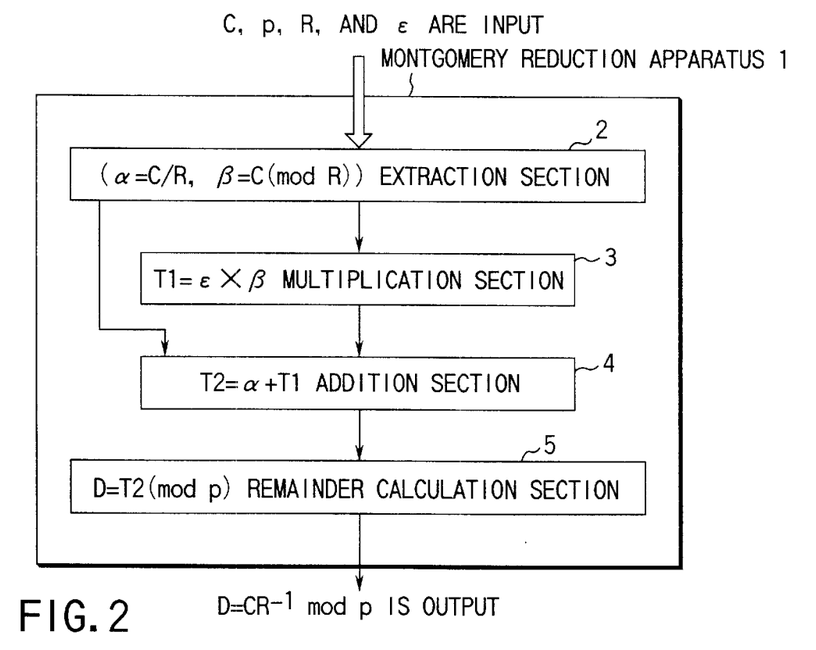
FIG. 2 is a block diagram showing a Montgomery reduction apparatus according to the first embodiment.

FIG. 2 is a block diagram showing an example of the arrangement of the Montgomery reduction apparatus according to this embodiment.

A Montgomery reduction apparatus 1 is implemented when a computer including a CPU, a memory, and other peripheral elements is controlled by programs. This apparatus is comprised of an ($\alpha$, $\beta$) extraction section 2, a T1 multiplication section 3, a T2 addition section 4, and a D remainder calculation section 5.

The Montgomery reduction apparatus 1 of this embodiment executes only Montgomery reduction of various arithmetic operations in the Montgomery computation system. Applications of the apparatus 1 will be described later.

When the multiple-length integer C as a calculation target to be subjected to Montgomery reduction, the modulus p, and the constant R and the value E defined by $R^{-1} = \epsilon \pmod{p}$, which are auxiliary parameters for Montgomery operation, are input to the Montgomery reduction apparatus 1, the ($\alpha$, $\beta$) extraction section 2 extracts two data represented by $\alpha = C/R$ and $\beta = C \pmod{R}$. In actual processing, C is arranged in units of words and is extracted as data on the upper and lower position sides with reference to R.

The T1 multiplication section 3 multiplies $\epsilon$ by $\beta$ extracted by the ($\alpha$, $\beta$) extraction section 2 to obtain a result T1. The section 3 is a calculation section for multiplying a 1-word integer and a multiple-length integer.

The T2 addition section 4 adds the result T1 obtained by the T1 multiplication section 3 to a extracted by the ($\alpha$, $\beta$) extraction section 2 to obtain a result T2.

The D remainder calculation section 5 obtains $D = T2 \pmod{p}$ from T2 obtained by the T2 addition section 4 and the modulus p. The D remainder calculation section 5 can be implemented by an integer division circuit and the like. In this case, it suffices if there is a circuit for performing division by using the multiple-length integer as a divisor and a number larger in size than the divisor by one word as a dividend.

The operation of the Montgomery reduction apparatus having the above arrangement according to this embodiment of the present invention will be described next.

Figure 3:
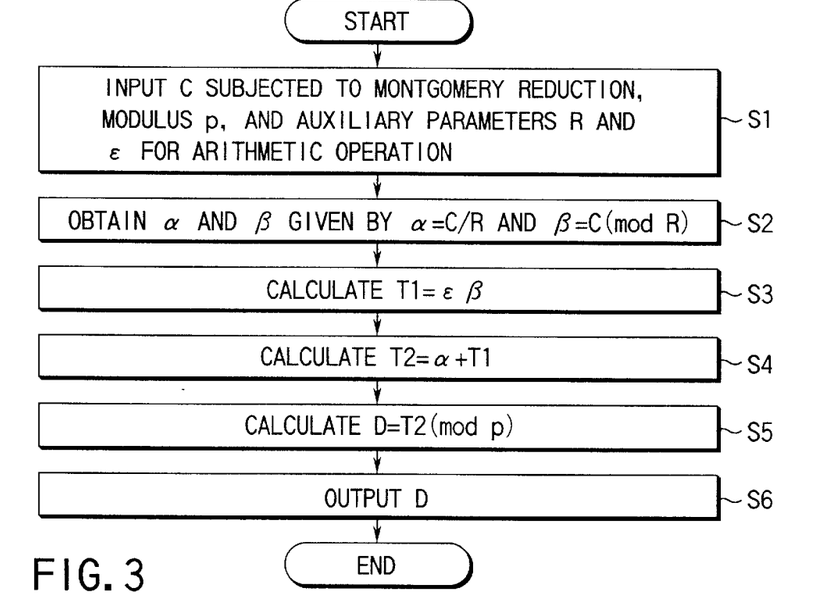
FIG. 3 is a flow chart showing a calculation procedure in the Montgomery reduction apparatus according to the first embodiment.

FIG. 3 is a flow chart showing a calculation procedure in the Montgomery reduction apparatus of this embodiment.

In step S1, the data C subjected to Montgomery reduction, the modulus p, and R and $\epsilon$ which are auxiliary parameters for arithmetic operation are input to the ($\alpha$, $\beta$) extraction section 2. In step S2, $\alpha = C/R$ and $\beta = C \pmod{R}$ is calculated by the ($\alpha$, $\beta$) extraction section 2. In this processing, C is divided into a lower portion up to the nth bit from the lowermost position and an upper portion relative to the lower portion, and the former is represented by $\beta$; and the latter, $\alpha$.

In step S3, the T1 multiplication section 3 calculates $T1 = \epsilon \times \beta$. In step S4, the T2 addition section 4 calculates $T2 = \alpha + T1$.

Lastly, in step S5, the D remainder calculation section 5 calculates $D = T2 \pmod{p}$. In step S6, this value is output, and the processing is terminated.

In the above processing, step S3 is multiplication of a 1-word integer and a multiple-length integer. When step S5 is executed by division, multiple-length integers divide each other. However, since only one uppermost word of the dividend needs to be reduced, the processing amount is small. As a whole, this processing amount is smaller than the processing amount required when one multiplication of multiple-length integers is performed in general Montgomery reduction.

As described above, since the Montgomery reduction apparatus of this embodiment sets the modulus p to a value suitable for an arithmetic expression in Montgomery reduction, Montgomery reduction operation can be implemented by a smaller calculation size.

Although the modulus p suitable for this calculation technique must be selected in advance in this apparatus 1, a typical encryption algorithm is capable of such setting. The computation size required for encryption processing can therefore be greatly reduced. In Montgomery reduction operation used in a remainder computation system using an odd integer permanently used for public key encryption or the like as a modulus, the computation size can be reduced.

(Second Embodiment of Present Invention)

According to the computation technique in the first embodiment, the result D' larger in size than the desired Montgomery reduction result D by one word can be obtained by one multiplication of a 1-word integer and a multiple-length integer. However, in this case as well, arithmetic operation such as division or operation using a remainder table is required to obtain D from D', and hence the problem of poor efficiency of the processing remains unsolved. As this embodiment, a Montgomery reduction calculation method which can solve this problem will be described.

Figure 4:
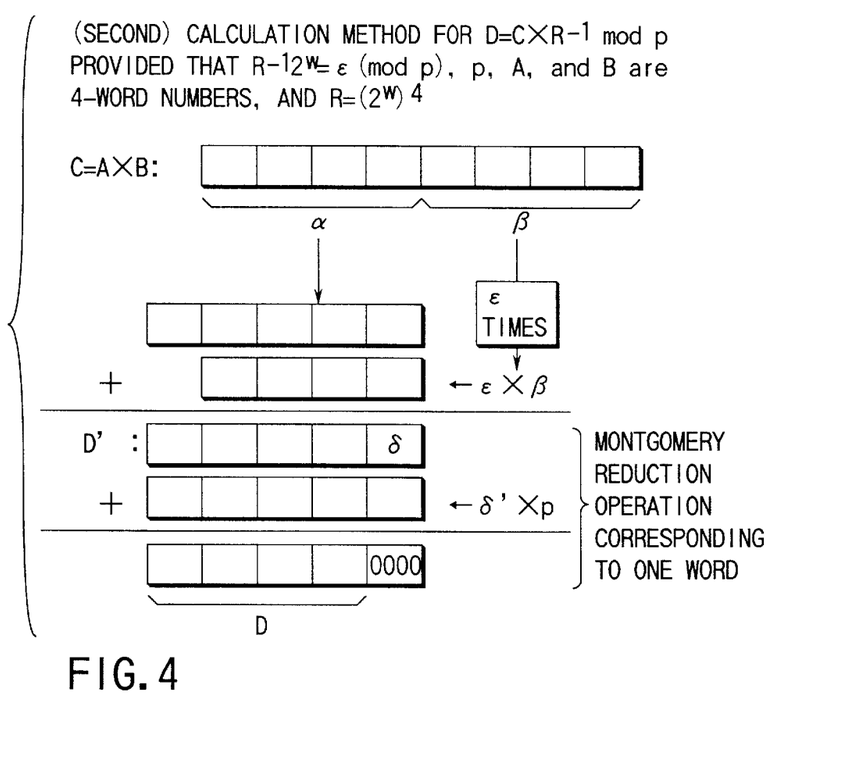
FIG. 4 is a view for explaining the principle of a Montgomery reduction calculation method in the second embodiment of the present invention.

FIG. 4 is a view for explaining the principle of the Montgomery reduction calculation method of the second embodiment of the present invention.

The present invention is based on the premise that when the bit length of one word in a computer is represented by w, a modulus p for which an integer $\epsilon$ that falls short of one word and satisfies $R^{-1} 2^w = \epsilon \pmod{p}$ is present is used.

Note that $\epsilon$ may be a negative integer. In this case, $\epsilon$ in the following description is replaced with $-\epsilon'(\epsilon = -\epsilon'$ and $\epsilon' > 0)$, and similar processing is performed.

As in the case shown in FIG. 1, C subjected to Montgomery reduction is smaller in size than a value twice the modulus p. In this calculation method, when C is divided into upper position side data $\alpha$ and lower position side data $\beta$, $\alpha$ and $\beta$ are divided with reference to the position of $R2^{-w}$ (a position at which data is smaller in size than the modulus p by one word). That is, $C = \alpha(R \cdot 2^{-w}) + \beta$. In the case shown in FIG. 4, C is divided at the third word from the lowermost position.

In this case, $$D = C \times R^{-1} \pmod{p}$$
$$= (\alpha(R \cdot 2^{-W}) + \beta) \cdot (R^{-1} \cdot 2^W) \cdot 2^{-W} \pmod{p}$$
$$= (\alpha + \beta \cdot (R^{-1} \cdot 2^W)) \cdot 2^{-W} \pmod{p}$$
$$= (\alpha + \beta \varepsilon) \cdot 2^{-W} \pmod{p}$$

The speciality ($R^{-1} 2^w \epsilon \pmod{p}$) is used in rewriting the last equation.

If $D' = \alpha \pm \beta \epsilon$, D' is larger than that of the modulus p by one word. However, $D = D' \cdot 2^{-w} \pmod{p}$ can be calculated by applying the Montgomery reduction calculation method to only the lowermost word, and the result is smaller in size than the modulus p. The calculation size required to obtain D' from D is equivalent to one multiplication of a 1-word integer and a multiple-length integer.

Since $R^{-1} \cdot 2^w = \epsilon \pmod{p}$ can be rewritten as $\epsilon(R \cdot 2^{-w}) - 1 = 0 \pmod{p}$, the modulus p to which the above computation principle can be applied satisfies $p = \epsilon \times 2^{n-w} \pm 1$. If $\epsilon > 0$, the modulus p satisfies $p = \epsilon \times 2^{n-w} - 1$. If $\epsilon < 0$, the modulus p satisfies $p = \epsilon' \times 2^{n-w} + 1$ where $\epsilon' = -\epsilon$.

An apparatus for implementing the above computation method will be described in detail next.

Figure 5:
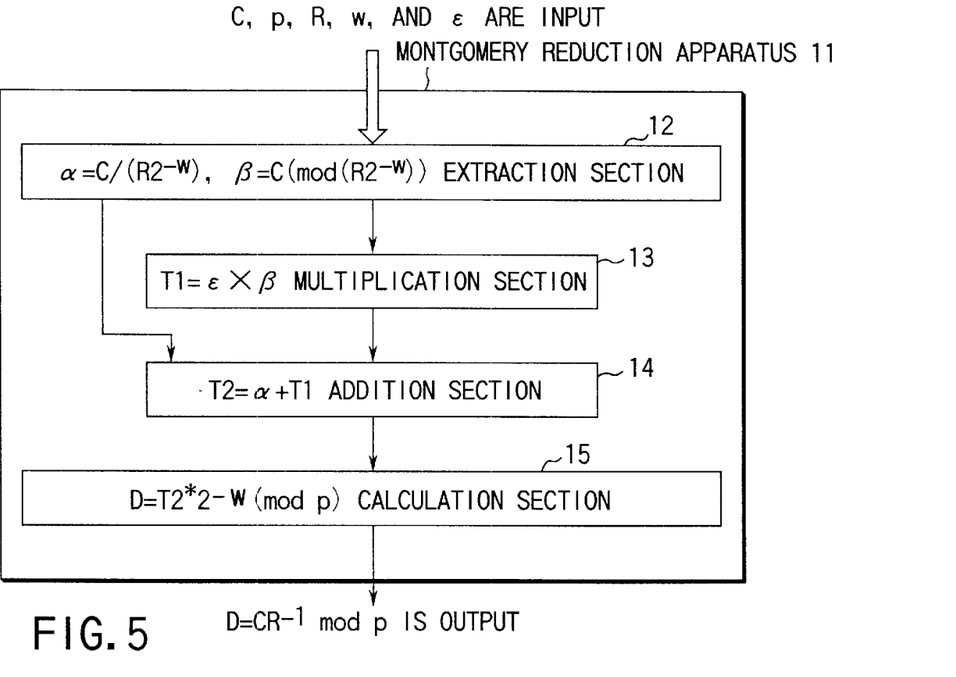
FIG. 5 is a block diagram showing a Montgomery reduction apparatus according to the second embodiment.

FIG. 5 is a block diagram showing an example of the arrangement of a Montgomery reduction apparatus according to this embodiment.

A Montgomery reduction apparatus 11 is implemented by a computer as in the first embodiment. FIG. 5 shows a function implementation block consisting of a combination of hardware and software. More specifically, the Montgomery reduction apparatus 11 is comprised of an ($\alpha$, $\beta$) extraction section 12, a T1 multiplication section 13, a T2 addition section 14, and a D calculation section 15.

When the multiple-length integer C as a calculation target to be subjected to Montgomery reduction, the modulus p, and the constant R and the value $\epsilon$ defined by $R^{-1} \cdot 2^w = \epsilon \pmod{p}$, which are auxiliary parameters for Montgomery operation, are input to the Montgomery reduction apparatus 11, the (α, β) extraction section 12 extracts two data represented by $\alpha=C/(R2^{-w})$ and $\beta=C(\bmod R2^{-w})$.

The T1 multiplication section 13 is a calculation section for multiplying a 1-word integer and a multiple-length integer. The section 13 multiplies ε by β extracted by the (α, β) extraction section 12 to obtain a result T1.

The T2 addition section 14 adds the result T1 obtained by the T1 multiplication section 13 to α extracted by the (α, β) extraction section 12 to obtain a result T2.

The D remainder calculation section 15 obtains $D=T2\cdot 2^{-w}(\bmod p)$ from T2 obtained by the T2 addition section 14 and the modulus p. The D remainder calculation section 15 can be implemented by a 1-word integer/multiple-length integer multiplier and a multiple-length adder.

The operation of the Montgomery reduction apparatus having the above arrangement according to this embodiment of the present invention will be described next.

Figure 6:
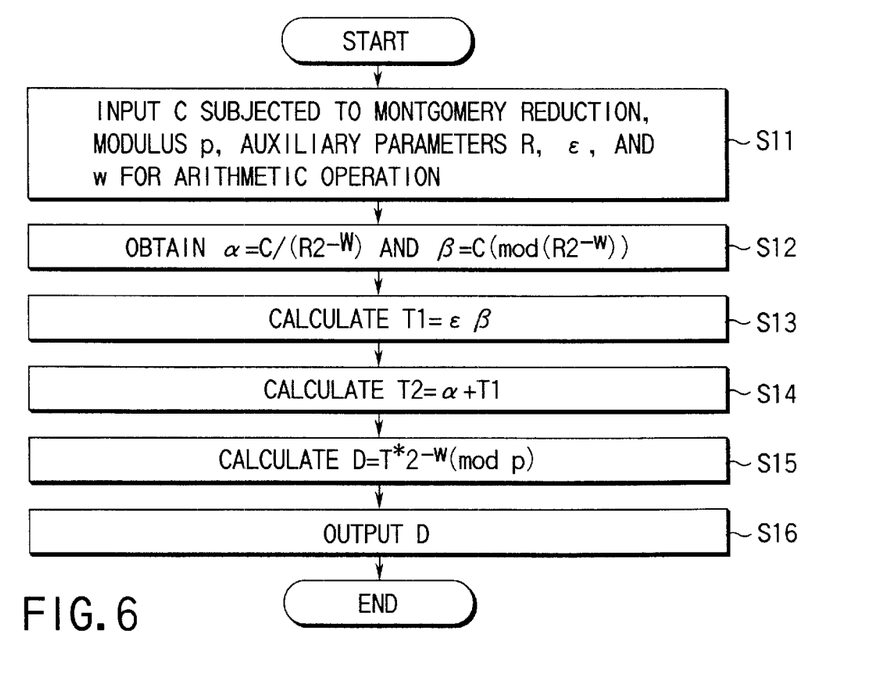
FIG. 6 is a flow chart showing a calculation procedure in the Montgomery reduction apparatus according to the second embodiment.

FIG. 6 is a flow chart showing a calculation procedure in the Montgomery reduction apparatus of this embodiment.

First of all, in step S11, the data C subjected to Montgomery reduction, the modulus p, R and ε which are auxiliary parameter for arithmetic operation, and the word length w of the computer are input to the (α, β) extraction section 12. In step S12, the (α, β) extraction section 12 obtains $\alpha=C/(R2^{-w})$ and $\beta=C(\bmod (R2^{-w}))$. In this processing, C is divided into a lower portion up to the bit position at which the data is smaller in size than the modulus p by one word from the lowermost position and an upper portion relative to the lower portion, and the former is represented by β; and the latter, α.

In step S13, the T1 multiplication section 13 calculates T1=ε×β. In step S14, the T2 addition section 14 calculates T2=α+T1.

Lastly, in step S15, the D calculation section 15 calculates $D=T2\cdot 2^{-w}(\bmod p)$. In step S16, D is output as the computation result, and the processing is terminated.

In the above processing, step S13 is multiplication of a 1-word integer and a multiple-length integer. In step S15, D can be calculated by executing Montgomery reduction operation corresponding to one word. The processing amount in this step is equivalent to multiplication of a 1-word integer and a multiple-length integer. As a whole, therefore, D can be calculated by two multiplications of 1-word integers and multiple-length integers.

A procedure for Montgomery reduction operation corresponding to one word as a calculation procedure in step S15 will be described next.

Figure 7:
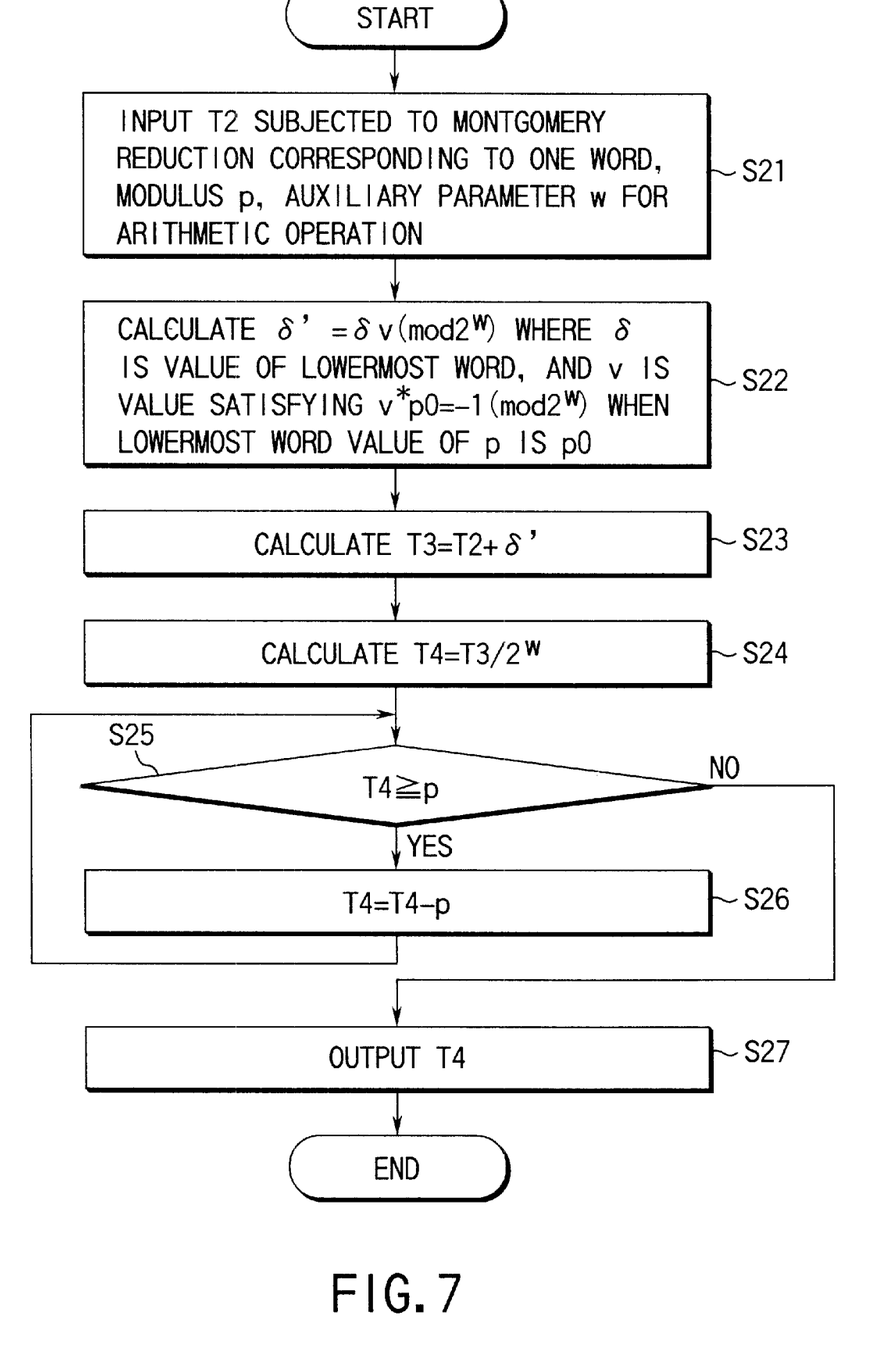
FIG. 7 is a flow chart showing a calculation procedure in a calculation section.

FIG. 7 is a flow chart showing calculation processing in the D calculation section.

First of all, in step S21, the data T2 as a calculation target, the modulus p, and the word length w of the computer which is an auxiliary parameter for arithmetic operation are input. In step S22, $\delta'=\delta\cdot(\bmod 2^w)$ is calculated. In this case, δ is the lowermost one word of T2, and v is a value that satisfies by $v\cdot p0=-1(\bmod 2^w)$ where p0 is the lowermost one word of the modulus p.

Since the modulus p used in this computation method is expressed as $p=\epsilon\times 2^{n-w}\pm 1$, $p0=\pm 1(\bmod 2^w)$ and v=±1. In step S21, therefore, the lowermost word of T2 is extracted, and the value of the extracted word is represented by δ'(ε>0) or the value obtained by inverting the sign of the lowermost word of T2 is represented by δ'(ε<0).

In step S23, T3=T2 +δ' is calculated. Note that the lowermost one word of T3 becomes 0.

In step S24, $T4=T3/(2^w)$ is obtained. This processing is equivalent to representing data obtained by removing the lowest one word of T3 as T4.

The result obtained in this manner may sometimes be larger than P by about one bit. In step S25, T4 is compared with p. If T4 is equal to p or more, p is subtracted from T4 in step S26. By repeating this operation, T4 becomes equal to the modulus p or less. In step S27, therefore, T4 is output, and the processing is terminated.

As described above, the Montgomery reduction apparatus of this embodiment of the present invention sets the modulus p as a value suitable for an arithmetic expression in Montgomery reduction, and hence can implement Montgomery reduction operation with a smaller calculation size than the first embodiment.

That is, Montgomery reduction calculation performed with a calculation amount equivalent to one multiplication of a multiple-length integer and a multiple-length integer in the prior art is implemented with a calculation size equivalent to two multiplications of single-precision integers and multiple-length integers. Since the typical size of a multiple-length integer used for encryption processing is larger than a single-precision integer by 5 to 64 times, the processing amount can be reduced by about 2.5 to 32 times.

(Third Embodiment of Present Invention)

Another embodiment that implements Montgomery reduction calculation with a processing amount equal to that in the second embodiment will be described below.

Figure 10:
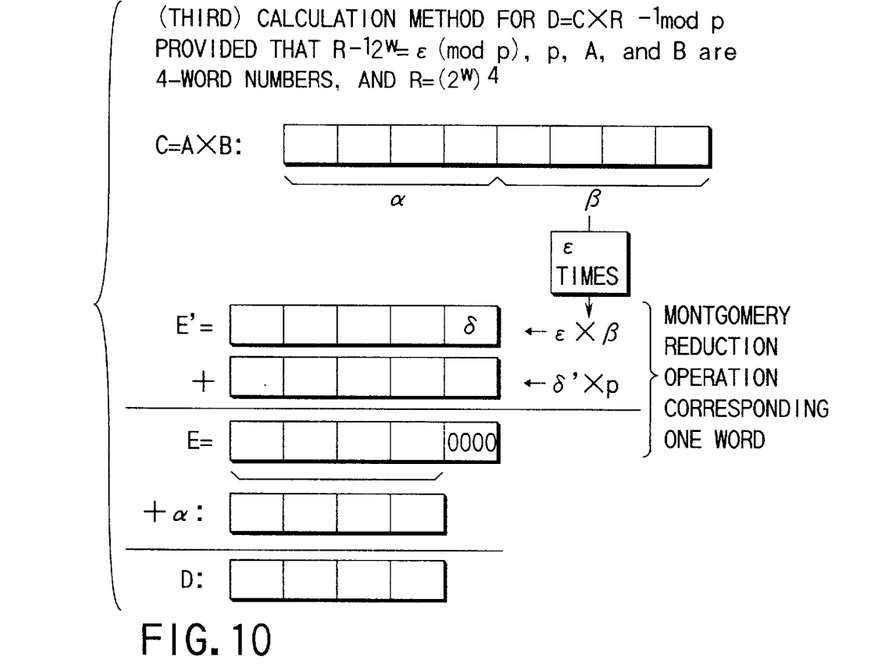
FIG. 10 is a view for explaining the principle of a Montgomery reduction calculation method according to the third embodiment of the present invention.

FIG. 10 is a view for explaining the principle of a Montgomery reduction calculation method according to the third embodiment of the present invention. As in the second embodiment, the present invention is based on the premise that when the bit length of one word in a computer is represented by w, a modulus p for which an integer ε that falls short of one word and satisfies $R^{-1}2^w=\epsilon(\bmod p)$ is present is used. The modulus p therefore satisfies $p=\epsilon'\times 2^{n-w}\pm 1$. In this case, ε' includes ε (when ε>0) and (when ε<0).

As in the cases shown in FIGS. 1 and 4, C subjected to Montgomery reduction is equal to or smaller in size than a value twice the modulus p. In this calculation method, C is divided into upper position data α and lower position data β with reference to the position of R (position corresponding to the size of the modulus p). That is, C=αR +β. In the case shown in FIG. 10, C is divided at the fourth word from the lowermost position.

In this case, $$D = C \times R^{-1}(\bmod p)$$
$$= (\alpha R + \beta) \cdot R^{-1}(\bmod p)$$
$$= (\alpha + \beta \cdot (R^{-1} \cdot 2W) \cdot 2^{-W})(\bmod p)$$
$$= (\alpha + (\beta \varepsilon) \cdot 2^{-W})(\bmod p)$$

The speciality $(R^{-2w}=\epsilon(\bmod p))$ of p is used for the last equation transformation.

If E'=βε, E' is larger than that of the modulus p by one word. However, $E=E'\cdot 2^{-w}(\bmod p)$ can be calculated by applying the Montgomery reduction calculation to the lowermost word of E'. The size of the calculation result is equal to or less than that of the modulus p. The calculation size required to obtain E form E' is equivalent to one multiplication of a 1-word integer and a multiple-length integer.

Lastly, a desired value D is obtained by calculating $D=\alpha+E(\bmod p)$. In this step, if the sum of α and E becomes larger than the modulus p, the modulus p may be subtracted from the sum.

An apparatus for implementing the above computation method will be described in detail next.

Figure 11:
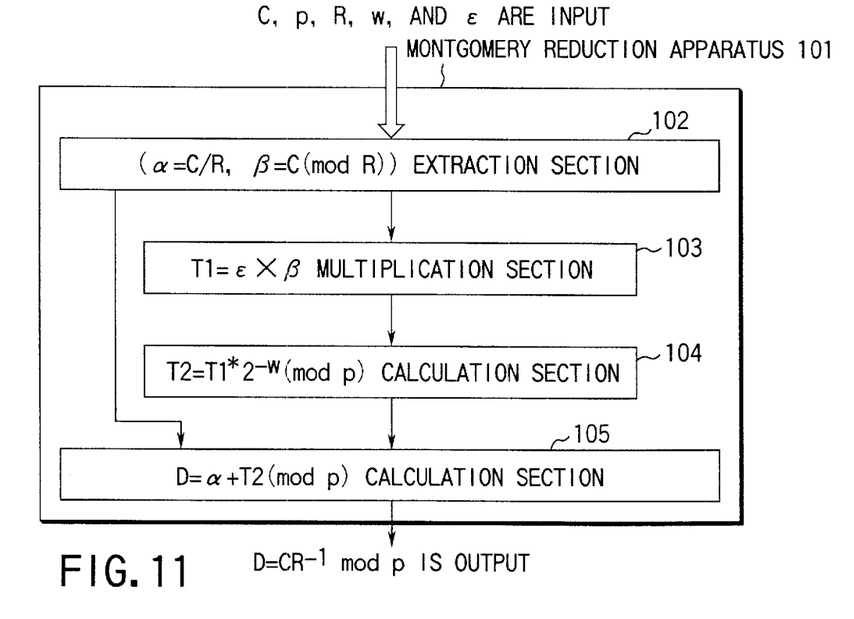
FIG. 11 is a block diagram showing a Montgomery reduction apparatus according to the third embodiment.

FIG. 11 is a block diagram showing the arrangement of a Montgomery reduction apparatus according to this embodiment.

A Montgomery reduction apparatus 101 is implemented by a computer as in the first and second embodiments. FIG. 11 shows a function implementation block consisting of a combination of hardware and software. The Montgomery reduction apparatus 101 is comprised of an ($\alpha$, $\beta$) extraction section 102, a T1 multiplication section 103, a T2 calculation section 104, and a D calculation section 105.

When the multiple-length integer C as a calculation target to be subjected to Montgomery reduction, the Modulus p, the constant R and the value $\epsilon$ defined by $R^{-1} \cdot 2^w = \epsilon \pmod{p}$, which are auxiliary parameters for Montgomery operation, and w are input to the Montgomery reduction apparatus 101, the ($\alpha$, $\beta$) extraction section 102 extracts two data represented by $\alpha = C/R$ and $\beta = C \pmod{R}$.

The T1 multiplication section 103 is a calculation section for multiplying a 1-word integer and a multiple-length integer. The T1 multiplication section 103 multiplies $\epsilon$ and $\beta$ extracted by the ($\alpha$, $\beta$) extraction section 102 to obtain a result T1. The T2 calculation section 104 obtains $T2 = T1 \cdot 2^{-w} \pmod{p}$ from T1 obtained by the T1 multiplication section 103 and the modulus p. The T2 calculation section 104 is comprised of a 1-word integer/multiple-length integer multiplier and a multiple-length adder.

The D calculation section 105 adds T2 obtained by the T2 calculation section 104 and $\alpha$ extracted by the ($\alpha$, $\beta$) extraction section 102. If the sum is larger than the modulus p, p is subtracted from the sum to obtain $D = \alpha + T2 \pmod{p}$. The D calculation section 105 is implemented by a multiple-length adder.

The operation of the Montgomery reduction apparatus having the above arrangement according to this embodiment of the present invention will be described next.

Figure 12:
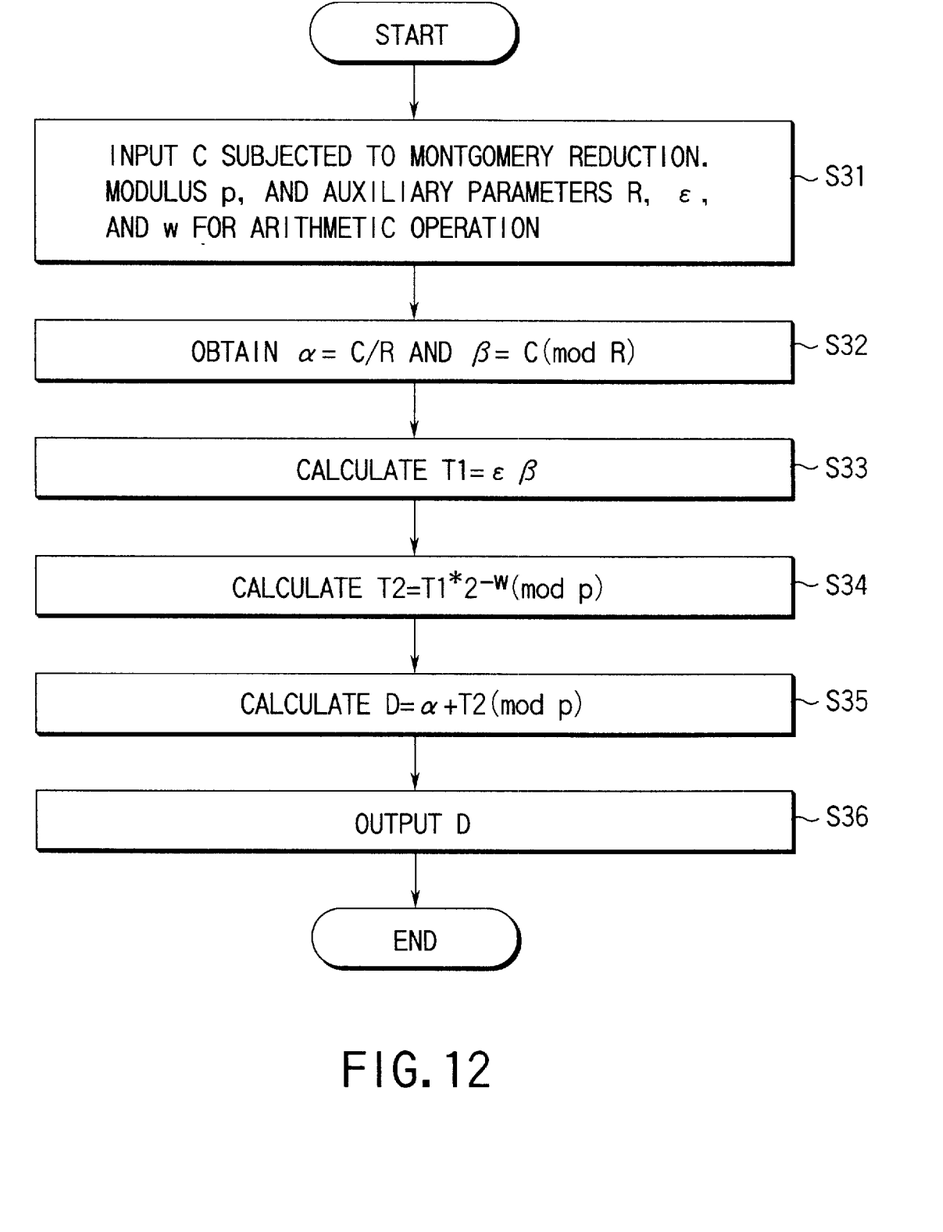
FIG. 12 is a flow chart showing a calculation procedure in the Montgomery reduction apparatus according to the third embodiment.

FIG. 12 is a flow chart showing a calculation procedure in the Montgomery reduction apparatus of this embodiment. First of all, in step S31, the data C subjected Montgomery reduction, the modulus p, R and $\epsilon$ which are auxiliary parameters for arithmetic operation, and the word length w of the computer are input to the ($\alpha$, $\beta$) extraction section 102.

In step S32, the ($\alpha$, $\beta$) extraction section 102 obtains $\alpha = C/R$ and $\beta = C \pmod{R}$. In this processing, C is divided into a lower portion ranging from the lowermost position to a position corresponding to the size of the modulus p and an upper portion relative to the lower portion, and the former is represented by $\beta$; and the latter, $\alpha$.

In step S33, the T1 multiplication section 103 calculates $T1 = \epsilon \times \beta$. In step S34, the T2 calculation section 104 calcultes $T2 = T1 \cdot 2^{-w} \pmod{p}$.

Lastly, in step S35, the D calculation section 105 calculates $D = \alpha + T2 \pmod{p}$. In step S36, this value is output as the calculation result, and the processing is terminated.

In the above processing, step S33 is multiplication of a 1-word integer and a multiple-length integer. In step S34, T2 can be calculated by executing Montgomery reduction operation corresponding to one word. The processing amount in this step is equivalent to multiplication of a 1-word integer and a multiple-length integer.

Since step S35 is equivalent to addition processing of a multiple-length integer, the processing amount is negligible as compared with the overall processing amount. Hence, D can be calculated by two multiplications of 1-word integers and multiple-length integers as a whole.

The computation means shown in FIG. 7 can be used as an actual procedure in the T2 calculation section 104 in this embodiment or step S34 in FIG. 12.

Note that the Montgomery reduction method and apparatus of each embodiment of the present invention can be applied to the field of information security using an encryption unit and the like. For example, the modulus p is fixed in Diffie-Hellman as a typical algorithm for the key distribution scheme, ElGamal encryption and elliptic curve encryption in public key cryptography, and DSA and ECDSA in the digital signature scheme. If, therefore, a parameter is selected as the modulus p that implements the processing method of the present invention, the processing efficiency of key distribution and encryption processing can be greatly improved.

Figure 8:
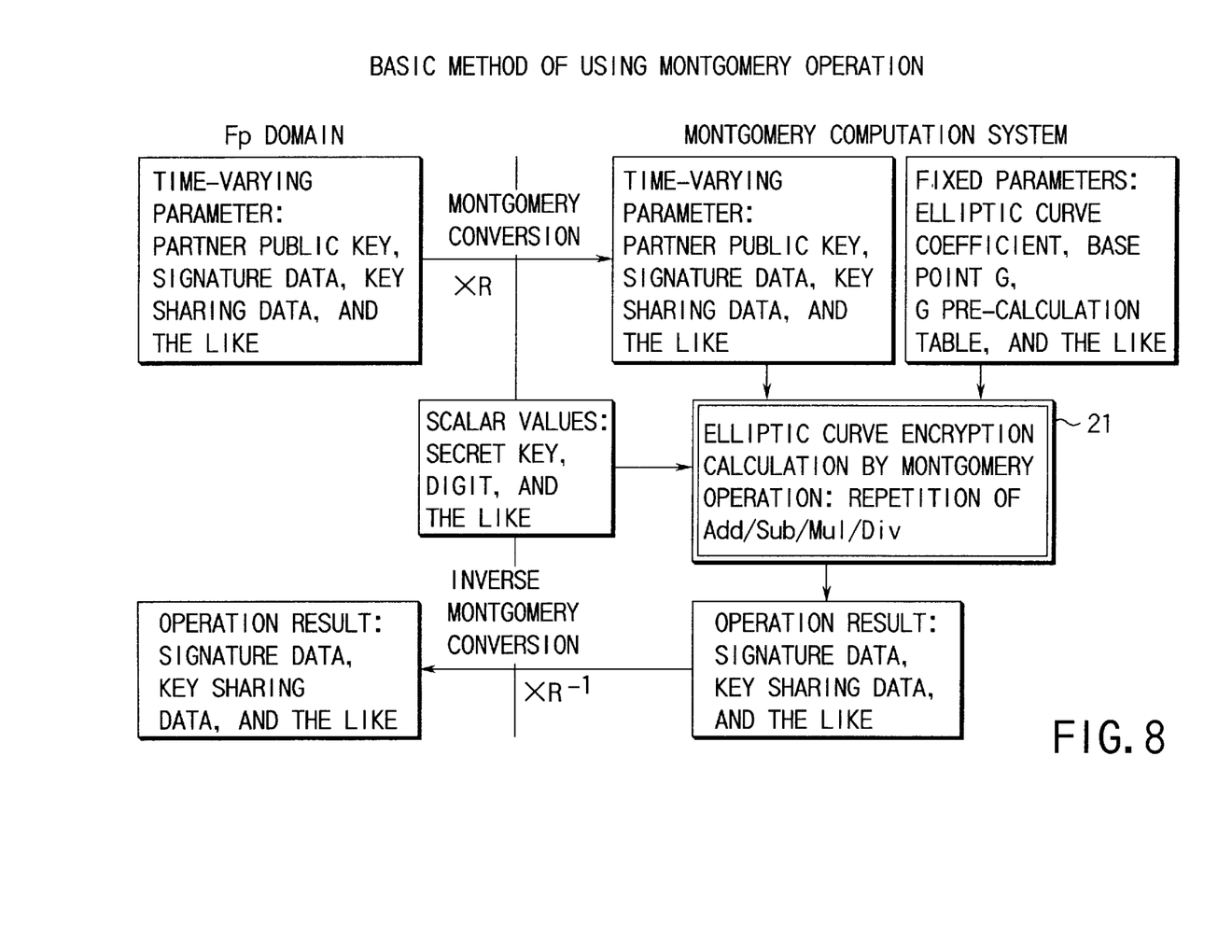
FIG. 8 is a view showing a system to which the Montgomery reduction techniques of the present invention are applied.

FIG. 8 shows an example of a system that uses the Montgomery reduction method of the present invention.

Referring to FIG. 8, the Montgomery reduction apparatus of the present invention is used in an elliptic curve encryption calculation section 21 based on Montgomery operation.

A case wherein a Montgomery reduction apparatus 1/11 according to each embodiment described above is applied to an elliptic curve encryption unit will be described below.

Figure 9:
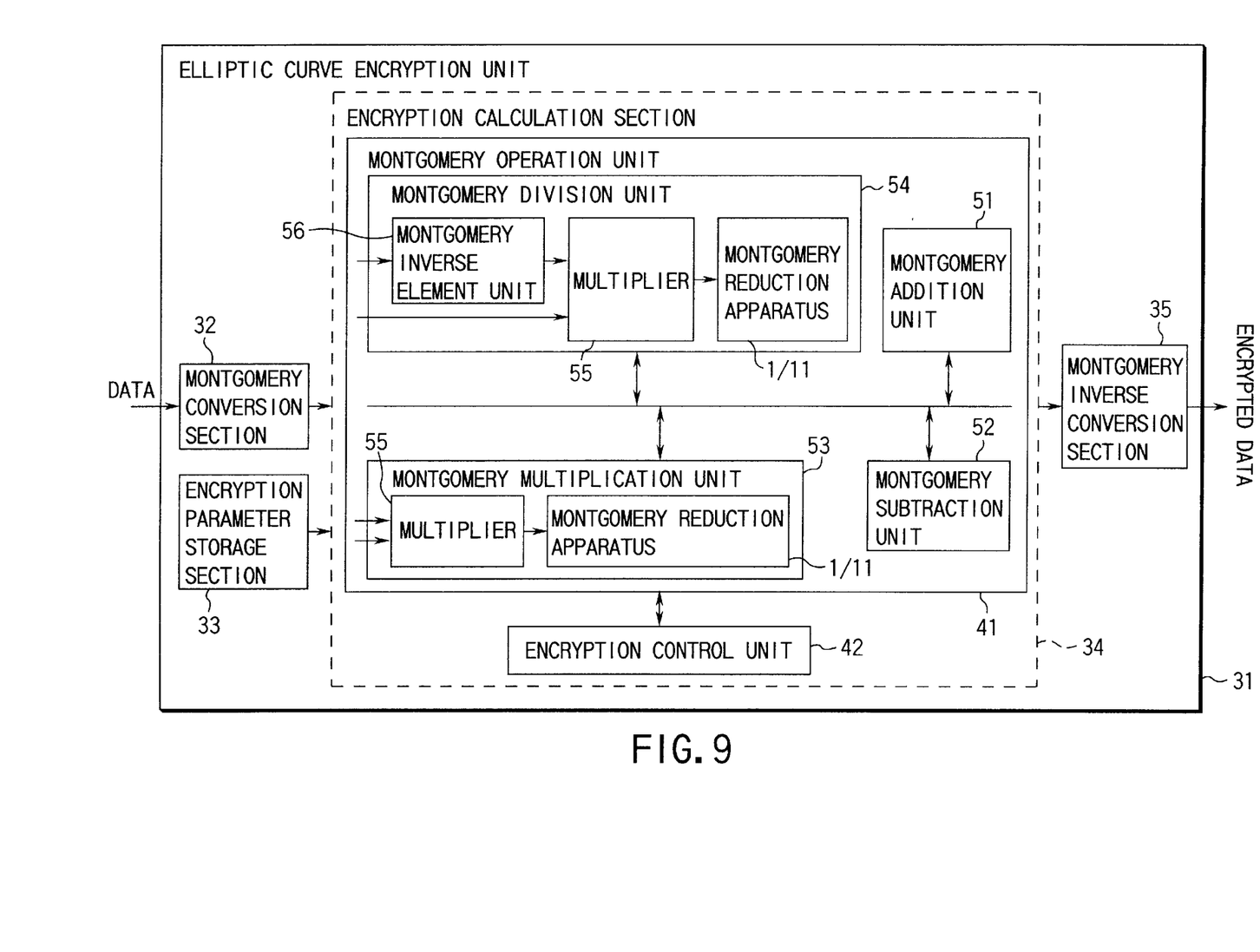
FIG. 9 is a block diagram showing an elliptic curve encryption apparatus using the Montgomery reduction apparatus according to an embodiment of the present invention.

FIG. 9 is a block diagram showing an example of the arrangement of the elliptic curve encryption apparatus according to this embodiment.

An elliptic curve encryption unit 31 is implemented by a computer such as a personal computer or workstation, and includes a Montgomery conversion section 32, an encryption parameter storage section 33, an encryption calculation section 34, and a Montgomery inverse conversion section 35. Note that the encryption calculation section 34 corresponds to the elliptic curve encryption calculation section 21 in FIG. 8.

The Montgomery conversion section 32 converts encryption target data input to the unit 31 from the $F_p$ domain to the Montgomery operation domain.

The encryption parameter storage section 33 supplies various parameters required for encryption to the encryption calculation section 34.

The Montgomery inverse conversion section 35 inversely converts the encrypted data obtained by the encryption calculation section 34 from the Montgomery operation domain to the $F_p$ domain.

The encryption calculation section 34 encrypts the data converted by the Montgomery conversion section 32 by using encryption parameters. The encryption calculation section 34 includes a Montgomery operation unit 41 and an encryption control unit 42.

The Montgomery operation unit 41 performs Montgomery addition, subtraction, multiplication, and division operations, and is comprised of a Montgomery subtraction unit 52, a Montgomery multiplication unit 53, and a Montgomery division unit 54.

The Montgomery multiplication unit 53 further includes a multiplier 55 and a Montgomery reduction apparatus 1/11. The Montgomery division unit 54 is comprised of a Montgomery inverse element unit 56 and a Montgomery reduction apparatus 1/11. The Montgomery reduction apparatuses 1/11 arranged in the respective sections 53 and 54 are identical to the apparatus of the first or second embodiment described above.

The encryption control unit 42 uses the arithmetic operation units 51, 52, 53, and 54 arranged in the Montgomery operation unit 41, and controls processing for encryption of input data on the basis of the parameters in the encryption parameter storage section 33.

In the elliptic curve encryption unit 31 having this arrangement, since efficient Montgomery reduction is performed in the Montgomery reduction apparatuses 1/11, input data can be quickly encrypted and output as encrypted data.

Note that the present invention is not limited to the above embodiments, and various changes and modifications can be made without departing from the spirit and scope of the invention.

The techniques described in the embodiments can be stored, as programs (software means) that can be executed by a computer, in storage media such as magnetic disks (floppy disks, hard disks, and the like), optical disks (CD-ROMs, DVDs, and the like), and semiconductor memories, or can be transmitted through communication media to be distributed. Note that the programs stored in such a medium include a setting program for installing in the computer software means (including tables and data structures as well as execution programs), which is executed by the computer. The computer that implements this apparatus loads the programs stored in the storage medium, and constructs the software means in accordance with the setting program, as needed, to allow the software means to control operation, thereby executing the above processing.

As has been described in detail above, according to the present invention, there is provided a Montgomery reduction apparatus and storage medium, which can implement Montgomery reduction with a small calculation size and greatly improve the efficiency of Montgomery reduction by setting the modulus p as a value suitable for an arithmetic expression in Montgomery reduction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A Montgomery reduction apparatus for receiving positive integers C and p and calculating $D=C \cdot R^{-1}$ mod p by using R defined as $R=2^n$ using an integer n falling within a range $n \geq L$ with a bit length being represented by L when p is expressed in binary notation, comprising:

an $(\alpha, \beta)$ extraction section for calculating an integer pair $(\alpha, \beta)$ satisfying $C=\alpha R+\beta$ on the basis of C and R;

a multiplication section for obtaining $\epsilon\beta$ by multiplying $\epsilon$ satisfying $R^{-1}=\epsilon(\text{mod } p)$ and $\beta$ calculated by said $(\alpha, \beta)$ extraction section;

an addition section for obtaining $\alpha+\epsilon\beta$ by adding $\alpha$ calculated by said $(\alpha, \beta)$ extraction section and $\epsilon\beta$ calculated by said multiplication section; and a calculation section for obtaining a remainder $D=\alpha+\beta\cdot\epsilon$ (mod p) which is congruent to $\alpha+\epsilon\beta$ obtained by said addition section with respect to p as a modulus and is not more than p.

2. A Montgomery reduction apparatus for receiving positive integers C and p and calculating $D=C \cdot R^{-1}$ mod p by using R defined as $R=2^n$ using an integer n falling within a range $n \geq L$ with a bit length being represented by L when p is expressed in binary notation, comprising:

an $(\alpha, \beta)$ extraction section for calculating an integer pair $(\alpha, \beta)$ satisfying $C=\alpha R'+\beta$ on the basis of C and R when w represents a word length and R' represents a value obtained by dividing R by $2^w$;

a multiplication section for obtaining $\epsilon\beta$ by multiplying an integer $\epsilon$ satisfying $R'^{-1}=\epsilon(\text{mod } p)$ and $\beta$ calculated by said $(\alpha, \beta)$ extraction section;

an addition section for obtaining $\alpha+\epsilon\beta$ by adding $\alpha$ calculated by said $(\alpha, \beta)$ extraction section and $\epsilon\beta$ calculated by said multiplication section; and a calculation section for obtaining $(\alpha+\epsilon\beta)\cdot 2^{-w}(\text{mod } p)$ on the basis of $\alpha+\epsilon\beta$ obtained by said addition section and w.

3. A computer-readable storage medium having a program code for controlling a Montgomery reduction apparatus for receiving positive integers C and p and calculating $D=C \cdot R^{-1}$ mod p by using R defined as $R=2^n$ using an integer n falling within a range $n \geq L$ with a bit length being represented by L when p is expressed in binary notation, the program code comprising:

$(\alpha, \beta)$ extraction means for calculating an integer pair $(\alpha, \beta)$ satisfying $C=\alpha R+\beta$ on the basis of C and R;

multiplication means for obtaining $\epsilon\beta$ by multiplying $\epsilon$ satisfying $R^{-1}=\epsilon(\text{mod } p)$ and $\beta$ calculated by said $(\alpha, \beta)$ extraction means;

addition means for obtaining $\alpha+\epsilon\beta$ by adding $\alpha$ calculated by said $(\alpha, \beta)$ extraction means and $\epsilon\beta$ calculated by said multiplication means; and calculation means for obtaining a remainder $D=\alpha+\beta\cdot\epsilon$ (mod p) which is congruent to $\alpha+\epsilon\beta$ obtained by said addition means with respect to p as a modulus and is not more than p.

4. A computer-readable storage medium having a program code for controlling a Montgomery reduction apparatus for receiving positive integers C and p and calculating $D=C \cdot R^{-1}$ mod p by using R defined as $R=2^n$ using an integer n falling within a range $n \geq L$ with a bit length being represented by L when p is expressed in binary notation, the program code comprising:

$(\alpha, \beta)$ extraction means for calculating an integer pair $(\alpha, \beta)$ satisfying $C=\alpha R'+\beta$ on the basis of C and R when w represents a word length and R' represents a value obtained by dividing R by $2^w$;

multiplication means for obtaining $\epsilon\beta$ by multiplying an integer $\epsilon$ satisfying $R'^{-1}=\epsilon(\text{mod } p)$ and $\beta$ calculated by said $(\alpha, \beta)$ extraction means;

addition means for obtaining $\alpha+\epsilon\beta$ by adding $\alpha$ calculated by said $(\alpha, \beta)$ extraction means and $\epsilon\beta$ calculated by said multiplication means; and calculation means for obtaining $(\alpha+\epsilon\beta)\cdot 2^{-w}(\text{mod } p)$ on the basis of $\alpha+\epsilon\beta$ obtained by said addition means and w.

5. A Montgomery reduction method of controlling a Montgomery reduction apparatus for receiving positive integers C and p and calculating $D=C \cdot R^{-1}$ mod p by using R defined as $R=2^n$ using an integer n falling within a range $n \geq L$ with a bit length being represented by L when p is expressed in binary notation, comprising the steps of:

calculating an integer pair $(\alpha, \beta)$ satisfying $C=\alpha R+\beta$ on the basis of C and R;

obtaining $\epsilon\beta$ by multiplying $\epsilon$ satisfying $R^{-1}=\epsilon(\text{mod } p)$ and calculated $\beta$;

obtaining $\alpha+\epsilon\beta$ by adding calculated $\alpha$ and calculated $\epsilon\beta$; and obtaining a remainder $D=\alpha+\beta\cdot\epsilon(\text{mod } p)$ which is congruent to obtained $\alpha+\epsilon\beta$ with respect to p as a modulus and is not more than p.

6. A Montgomery reduction method of controlling a Montgomery reduction apparatus for receiving positive integers C and p and calculating $D=C \cdot R^{-1}$ mod p by using R defined as $R=2^n$ using an integer n falling within a range $n \geq L$ with a bit length being represented by L when p is expressed in binary notation, comprising the steps of:

calculating an integer pair $(\alpha, \beta)$ satisfying $C=\alpha R'+\beta$ on the basis of C and R when w represents a word length and R' represents a value obtained by dividing R by $2^w$;

obtaining $\epsilon\beta$ by multiplying an integer satisfying $R'^{-1}=\epsilon$ (mod p) and calculated $\beta$;

obtaining $\alpha+\epsilon\beta$ by adding calculated $\alpha$ and calculated $\epsilon\beta$; and obtaining $(\alpha+\epsilon\beta)\cdot 2^{-w}\pmod p$ on the basis of obtained $\alpha+\epsilon\beta$ and w.

7. An elliptic curve encryption apparatus comprising:

a conversion section for performing Montgomery conversion of data to be encrypted;

a calculation section for calculating positive integers C and p subjected to Montgomery reduction on the basis of the data having undergone Montgomery conversion in said conversion section and encryption is parameters for encrypting the data subjected to encryption;

said Montgomery reduction apparatus defined in claim 1, which receives the positive integers C and p calculated by said calculation section; and an inverse conversion section for performing inverse Montgomery conversion of a remainder D obtained by a calculation section in said Montgomery reduction apparatus defined in claim 1 and outputting encrypted data.

8. An elliptic curve encryption apparatus comprising:

a conversion section for performing Montgomery conversion of data to be encrypted;

a calculation section for calculating positive integers C and p subjected to Montgomery reduction on the basis of the data having undergone Montgomery conversion in said conversion section and encryption parameters for encrypting the data subjected to encryption;

said Montgomery reduction apparatus defined in claim 2, which receives the positive integers C and p calculated by said calculation section; and an inverse conversion section for performing inverse Montgomery conversion of a remainder D obtained by a calculation section in said Montgomery reduction apparatus defined in claim 2 and outputting encrypted data.

9. A Montgomery reduction apparatus for receiving positive integers C and p and calculating $D=C\cdot R^{-1}$ mod p by using R defined as $R=2^n$ using an integer n falling within a range $n\geq L$ with a bit length being represented by L when p is expressed in binary notation, comprising:

an $(\alpha, \beta)$ extraction section for calculating an integer pair $(\alpha, \beta)$ satisfying $C=\alpha R+\beta$ on the basis of C and R;

a multiplication section for calculating $\epsilon\beta$ by multiplying $\epsilon$ satisfying $R'^{-1}=\epsilon\pmod p$ when w represents a word length and R' represents a value obtained by dividing R by $2^w$ and $\beta$ extracted by said $(\alpha, \beta)$ extraction section; and a calculation section for obtaining $E=\epsilon\beta 2^{-w}\pmod p$ on the basis of $\epsilon\beta$ obtained by said multiplication section and w, and obtaining $\alpha+E\pmod p$ on the basis of obtained E and $\alpha$ calculated by said $(\alpha, \beta)$ extraction section.

10. A computer-readable storage medium having a program code for controlling a Montgomery reduction apparatus for receiving positive integers C and p and calculating $D=C\cdot R^{-1}$ mod p by using R defined as $R=2^n$ using an integer n falling within a range $n\geq L$ with a bit length being represented by L when p is expressed in binary notation, the program code comprising:

$(\alpha, \beta)$ extraction means for calculating an integer pair $(\alpha, \beta)$ satisfying $C=\alpha R+\beta$ on the basis of C and R;

multiplication means for calculating $\epsilon\beta$ by multiplying $\epsilon$ satisfying $R'^{-1}=\epsilon\pmod p$ when w represents a word length and R' represents a value obtained by dividing R by $2^w$ and $\beta$ calculated by said $(\alpha, \beta)$ extraction means; and calculation means for obtaining $E=\epsilon\beta 2^{-w}\pmod p$ on the basis of $\epsilon\beta$ obtained by said multiplication means and w, and obtaining $\alpha+E\pmod p$ on the basis of obtained E and $\alpha$ calculated by said $(\alpha, \beta)$ extraction means.

11. A Montgomery reduction method of controlling a Montgomery reduction apparatus for receiving positive integers C and p and calculating $D=C\cdot R^{-1}$ mod p by using R defined as $R=2^n$ using an integer n falling within a range $n\geq L$ with a bit length being represented by L when p is expressed in binary notation, comprising the steps of:

calculating an integer pair $(\alpha, \beta)$ satisfying $C=\alpha R+\beta$ on the basis of C and R;

calculating $\epsilon\beta$ by multiplying $\epsilon$ Satisfying $R'^{-1}=\epsilon\pmod p$ when w represents a word length and R' represents a value obtained by dividing R by $2^w$ and calculated $\beta$; and obtaining $E=\epsilon\beta 2^{-w}\pmod p$ on the basis of obtained $\epsilon\beta$ and w, and obtaining $\alpha+E\pmod p$ on the basis of obtained E and calculated $\alpha$.

* * * * *

UNITED STATES PATENT AND TRADEMARK OFFICE
CERTIFICATE OF CORRECTION

PATENT NO.    : 6,546,104 B1
DATED         : April 8, 2003
INVENTOR(S)   : Shimbo et al.

It is certified that error appears in the above-identified patent and that said Letters Patent is hereby corrected as shown below:

<u>Column 14,</u>
Line 64, change "integer satisfying" to -- integer $\varepsilon$ satisfying --.

<u>Column 15,</u>
Line 9, change "encryption is parameters" to -- encryption parameters --.

<u>Column 16,</u>
Line 37, change "Satisfying" to -- satisfying --.

Signed and Sealed this

First Day of July, 2003

JAMES E. ROGAN
*Director of the United States Patent and Trademark Office*